E. WING.
BAKING PAN.
APPLICATION FILED MAY 5, 1909.

955,033.

Patented Apr. 12, 1910.

Witnesses:
F. E. Maynard

Inventor,
Esther Wing,
By Geo. H. Strong
his atty.

UNITED STATES PATENT OFFICE.

ESTHER WING, OF EUREKA, CALIFORNIA.

BAKING-PAN.

955,033.

Specification of Letters Patent. Patented Apr. 12, 1910.

Application filed May 5, 1909. Serial No. 494,149.

*To all whom it may concern:*

Be it known that I, ESTHER WING, a citizen of the United States, residing at Eureka, in the county of Humboldt and State of California, have invented new and useful Improvements in Baking-Pans, of which the following is a specification.

This invention relates to cooking utensils, and pertains especially to pans for baking crusts for pies, and especially those having a soft filling like lemon and custard pies and the like.

The object of my invention is to provide a pan which will enable the user to successfully form a perfect pie crust, or pastry shell for pies or the like; and so design and construct the pan that the crust may be evenly baked, and then easily removed in readiness to receive the filling.

The invention consists of the parts and the construction and combination of parts as hereinafter more fully described and claimed, having reference to the accompanying drawings, in which—

Figure 1:
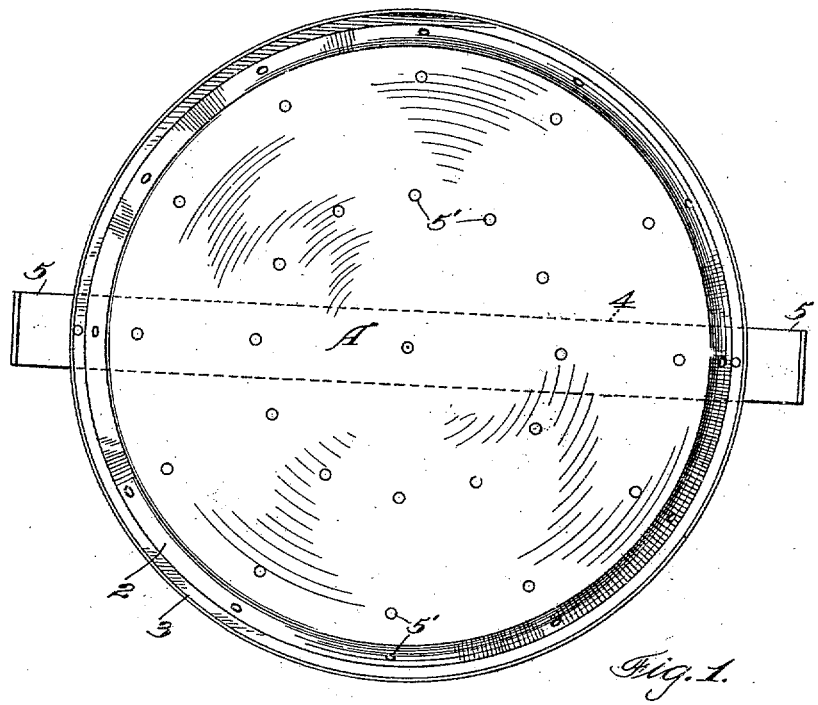
Figure 2:
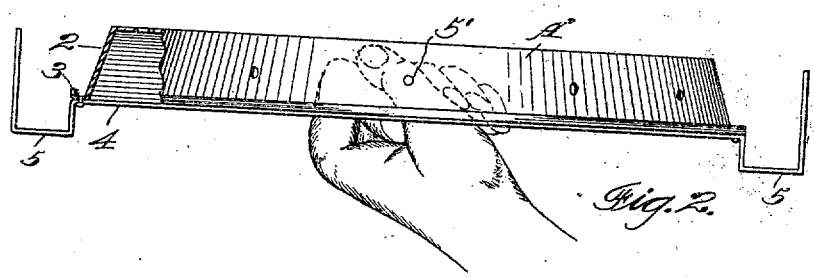

Figure 1 is a plan view of the pan. Fig. 2 is a side elevation, partly in section.

A represents the bottom of a pan of any suitable shape or size, having a downwardly turned, peripheral annular rim 2 of any desirable depth, the bottom edges of which are slightly flared outwardly to form a bead 3.

Extending crosswise beneath the pan and secured to the bead 3 is a metal strip 4, which is bent downwardly and then outwardly, forming a handle and providing feet 4 which thus elevate the pan A from its support, when placed in a stove, so that the heated air has a perfectly free circulation beneath and around the pan.

In operation, the user grasps the central portion of the strip 4 beneath the pan in one hand, and with the other places the rolled unbaked dough sheet over the pan, spreading it neatly so that it is shaped over the bottom A and down the sides 2, just like the finished crust is to be. The pan is then set in the oven, resting on the feet 4. If desired, the pan may be pierced at different points with small holes 5 to insure thorough evenness of baking of the crust.

When the baking has been finished, the pan is removed from the stove, and the crust easily taken off, by inverting the pan, after which the filling material may be introduced into the baked shell, and the pie placed in the oven until done. By this device it is possible to make crusts of perfect shape and perfectly baked.

Manifestly, pans or plates of various shapes and sizes may be used, and the invention is applicable for forming any sort of a pie crust shell, which is designed later to be filled with a filling of material which requires very little cooking as compared with the shell itself.

The cross bar or handle 4 is an essential feature in the use of this mold, inasmuch as the person using the same can hold it fast with one hand while shaping and cutting off the dough.

Having thus described my invention, what I claim and desire to secure by Letters Patent is—

1. A device for cooking hollow pastry shells which comprises a pan having an elevated bottom, with a downwardly turned peripheral flange, and means secured to the under side of the flange for supporting the pan in the oven to allow a circulation of heat up into the hollow part of the pan, said supporting means extending transversely across the central portion of the open side of the pan and serving as a handle for holding the pan in an inverted position, and legs at the edge of the pan extending beyond the plane of said handle and adapted to support the pan above the level of a heating surface.

2. A device for cooking pastry shells comprising a convexed device, over the convexity of which the pastry material is spread, the peripheral edge of the receptacle being out-turned to form an annular bead, and a metal strip secured across the hollow part of the pan and to said bead, with the end of the strip turned down to form legs.

In testimony whereof I have hereunto set my hand in presence of two subscribing witnesses.

ESTHER WING.

Witnesses:
J. F. QUINN,
ERNEST D. VORRATH.